United States Patent [19]
Linnainmaa et al.

[11] Patent Number: 5,928,602
[45] Date of Patent: Jul. 27, 1999

[54] METAL WASTE PROCESSING FACILITY

[75] Inventors: Jarkko Linnainmaa, Tuohikuja 6 A, FIN-02130 Espoo, Finland; Vladimir Vlasov, St. Petersburg, Russian Federation; Koshkar Mamedov, St. Petersburg, Russian Federation; Alexander Alexeev, St. Petersburg, Russian Federation

[73] Assignees: Jarkko Linnainmaa; Teknotyö-Metallurgia OY, both of Espoo, Finland

[21] Appl. No.: 08/930,768

[22] PCT Filed: Apr. 22, 1996

[86] PCT No.: PCT/FI96/00218

§ 371 Date: Apr. 14, 1998

§ 102(e) Date: Apr. 14, 1998

[87] PCT Pub. No.: WO96/34119

PCT Pub. Date: Oct. 31, 1996

[30] Foreign Application Priority Data

Apr. 25, 1995 [RU] Russian Federation ............. 95106705

[51] Int. Cl.[6] .................................. C21C 1/00; C22B 7/00
[52] U.S. Cl. ........................... 266/200; 266/900; 266/901
[58] Field of Search ..................................... 266/200, 205, 266/900, 901

[56] References Cited

U.S. PATENT DOCUMENTS

| 135,578 | 2/1873 | Panton | 266/205 |
| 2,176,267 | 10/1939 | Meiselman et al. | 266/205 |
| 3,193,273 | 7/1965 | Miller et al. | 266/205 |
| 3,401,925 | 9/1968 | Evans et al. | 266/205 |
| 3,468,524 | 9/1969 | Haack | 266/205 |
| 3,550,925 | 12/1970 | Evans et al. | 266/205 |
| 5,382,002 | 1/1995 | Evans et al. | 266/205 |
| 5,451,033 | 9/1995 | Perry et al. | 266/901 |

*Primary Examiner*—Scott Kastler
*Attorney, Agent, or Firm*—Kubovcik & Kubovcik

[57] ABSTRACT

A facility to process metal wastes is provided. The facility includes an inclined heat-insulated casing with a door and a cover, which can be displaced and removed. The inner surface of the casing is provided with removable sheets which form the inner facing (reflectors) of the casing and which are made of metal bead-formed sheets. Inside the casing, on a cantilever-supported shaft, is installed a melting drum, which can be mounted or removed from the shaft both charged and empty. The drum can be charged through the open cover when the casing door is open, while inside the casing it is kept installed on the shaft. A cross-shaped member for stiffening the drum is used also for mixing. The drum is heated via a burner and the heating is controlled with a temperature sensor and by means of an automatic control unit.

4 Claims, 1 Drawing Sheet

METAL WASTE PROCESSING FACILITY

BACKGROUND OF THE INVENTION (1) Field of the Invention

This invention relates to facilities for treating process metal wastes. More particularly, the invention relates to facilities for treating such industrial wastes as, far instance, the solid wastes resulting from hot zinc plating.

(2) Description of Related Art

Such a facility is known from the document U.S. Pat. No. 3,550,925. This document discloses a facility to process metal wastes including a heat-insulated casing, a melting drum with an outlet orifice and burners. The casing is set on supports in such a manner that its longitudinal axis is inclined relative to the support base. A melting drum is located inside the casing on a shaft in parallel with the casing base.

Further, tubular rotating type furnaces are known to provide the reducing roasting process under a temperature above 1000° C. Such furnaces are about 14 m long and 1.2 m in diameter; the time needed to construct such furnaces is 2 years while they can be operated about 15 years (See M. V. Teslitskaya, E. S. Razgon. New methods of processing raw zinc materials used abroad/in Russian/. Moscow Central Research Institute for Nonferrous Metals, Economics and Information, 1984). Another drawback with this known facility consists of its considerable fuel/power consumption rate during the multistage process of metal winning from the wastes when conventional facilities are applied, and in complexity of the structures used.

BRIEF SUMMARY OF THE INVENTION

The object of this invention is to avoid the drawbacks related to the known facilities of this kind, and more particularly the object consists of achieving a simple design, reducing overall dimensions, making the operation and maintenance easier, increasing the output, accelerating the process and power-saving heat consumption (to process 1 t of wastes, 60 t of Diesel fuel is needed, and the process takes up to 3 hours providing recuperation of 800 kg of zinc). The object has been affected by a new facility which is characterized by removable reflectors provided on the inner surface of the casing, and by that the melting drum is removably set up on a shaft which is cantilever-supported at the end of the casing which is opposite to the door of the casing.

DETAILED DESCRIPTION OF THE INVENTION

Figure 1:
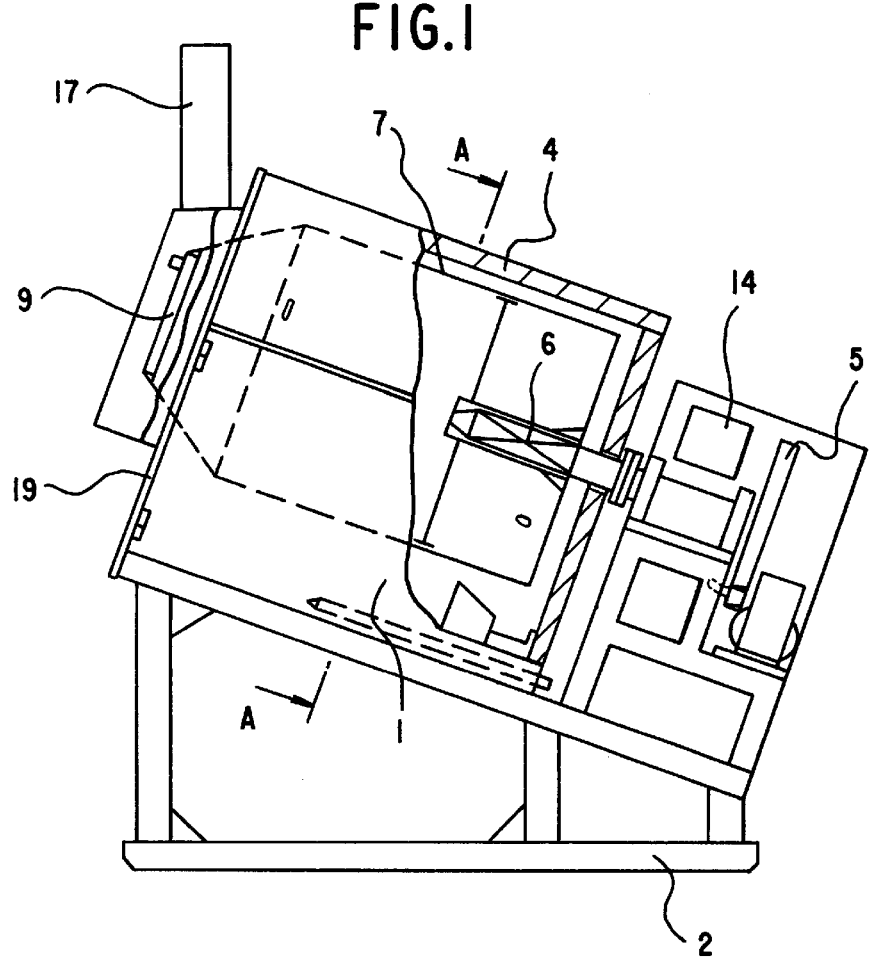
FIG. 1 is a side view of the facility to process metal wastes of the present invention with heat-insulated casing (1) partically cut away and showing a partial cross-section of the melting drum.
Figure 2:
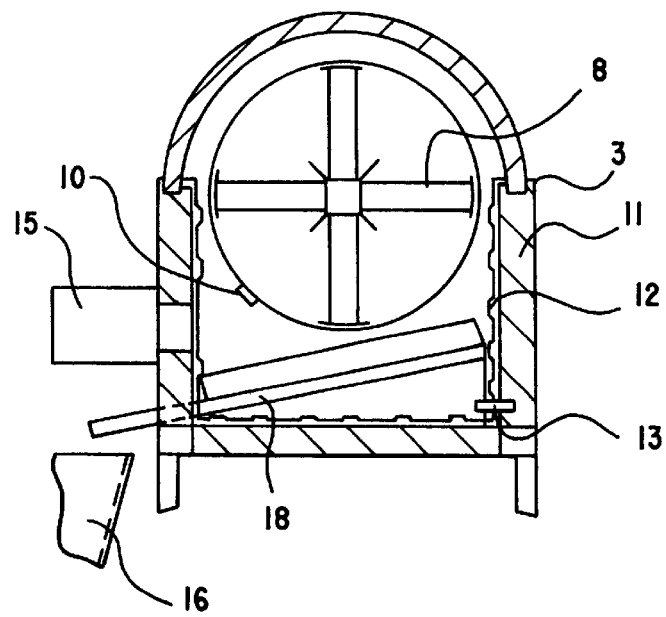
FIG. 2 is view of the heat-insulated casing (1) of the facility to process metal wastes of the present invention taken along line A—A in FIG. 1.

Thus, the facility according to the invention includes an inclined heat-insulated casing with a door and a cover, which can be displaced and, finally, removed. The inner surface of the casing is provided with removable sheets, forming the inner facing (reflectors) which are made of metal bead-formed sheets. Inside the casing, on the cantilever-supported shaft, is installed a melting drum, parallel with the sole, which can be mounted or removed from upon the shaft both charged and empty. The drum can be charged through the open cover when the casing door is open, while inside the casing it is kept installed on the shaft. A cross-shaped member for stiffening the drum is used also for mixing. The drum is heated via a burner while the heating is controlled with a temperature sensor and by means of an automatic control unit.

The casing of the facility according to the invention is heat-insulated and also provided with easily interchangeable and removable sheets of other inner facing in the shape of bead-formed metal sheets (reflectors). The drum is set on the cantilever-supported shaft thus making it possible to avoid the use of any stiffening belts and bearing rollers, ensuring prompt removal of the drum and its transportation to the charge area thus making it possible to avoid intermediary containers and to keep the drum capable to be charged while on. The casing has a door and a cover, located on the casing top, which can be displaced and, finally, removed. Prior to setting the drum on the shaft, the casing door should be opened, then the cover is to be displaced along the respective guides meeting in this way the necessary observation requirements. The facility is equipped with a temperature sensor and an automatic temperature conditions control unit, which also optimizes the mixing process.

The whole set of basic features of the proposed technical solution makes it possible to bring the drum to the charging area, to replace one drum by another, this process being well observed thanks to the displaceable cover, to remove soot from inside the drum through the inlet orifice, to replace promptly the inner facing sheets (reflectors), to reduce delay periods, as well as to effect an increased output. The top portion of the casing door bears an outlet pipe making easier the removal of combustion products on ordered base. The supporting elements of the casing base are ski-shaped.

A great advantage of the facility according to the invention is its simplicity, in particular, lack of roller conveyors, whose sizes in certain facilities are as large as 41*2.5 m and 50*3.6 mm, respectively; yet another great advantage is ensured by the possibility of prompt replacement of the heat reflectors while in conventional furnaces it amounts to 10–15 days. Cakings extraction from the conventional furnaces is fairly difficult, whereas in the present facility it is effected promptly, upon removal of the cover, through the inlet orifice of the overturned melting drum. The present invention has neither complicated seals system nor welded-in bandages which usually pose major problems when dealing with conventional furnaces.

In the following the invention is described more in detail by way of an example illustrated in the enclosed drawings.

The metal waste processing facility (see FIG. 1) includes a casing 1 with door 19. The casing has been installed on inclined supports 2; the casing walls are provided with heat insulation 11 and with removable sheets on the inner facing in the form of bead-formed metal sheets (reflectors) 12; guides 3 are available on top of the casing to displace a cover 4 up to being totally removed; the facility has a temperature sensor 13 and an automatic control unit 14, a burner 15 for heating the melting drum, a mould 16 for receiving the prepared melt, pipe 17 to remove combustion products on ordered base, tray 18 onto which the melt in discharged through an outlet orifice 10 from the drum 7 having a cross-shaped stiffening member 8 and a cover 9; the drum is set up on a shaft 6 to which a mechanism 5 transmits motion.

The facility according to the invention operates as follows: the melting drum is mounted inside the casing 1 with the door 19 open and the cover 4 is displaced along guides 3 to the shaft located parallel with the casing bottom. The drum may be set up both charged or empty. When empty, it is charged through a charging unit with the cover 9 being open. Upon installation of the drum on the shaft and after the charging is completed, the cover 9 is closed, the cover 4 returns to its initial position, and the door 19 is closed, too. Next, the drum rotating mechanism is operated, fuel starts being fed to the burner to heat the drum. Using signals from the temperature sensor, the stable heating conditions of the drum and its contents are ensured with the use of the automatic control unit. The time required to process 1 t of wastes is 3 hours. Gases released in melting are evacuated in a natural way through pipe 17. Upon completion of the melting, the drum is stopped in such a position that the metal outlet orifice is up; then the plug is removed (pricked-up) and the drum is turned the outlet orifice down. Melt is discharged onto the tray 18 and then via this into mould 16.

In practice, the process can be effected continuously, since after discharging, the empty drum is taken away and replaced by another drum, already charged directly near the respective zinc plating baths, or this former is charged without being removed from upon the shaft after the cover 9 is opened.

As compared with other similar facilities, the proposed one is far more productive, easier in maintenance while availability of the removable and interchangeable reflectors enlarges its life.

We claim:

1. A facility to process metal wastes including a heat-insulated casing (1), melting drum with an outlet orifice (10), a burner (15) for heating the drum, the casing (1) being set up on supports (2) in such a manner that its longitudinal axis is inclined relative to a support base, the casing (1) including a door (19) at its upper end, characterized by removable reflectors (12) provided on the inner surface of the casing (1), and in that the melting drum is removably set up on a shaft (6) which is cantilever-supported at the end of the casing (1) which is opposite to the door (19) or the casing (1).

2. The facility as claimed in claim 1, characterized in that the melting drum is charged through an inlet orifice with the casing door (19) in an open position, while the drum remains on the shaft (6) inside the casing (1).

3. The facility as claimed in claim 1, characterized in that a cross-shaped member (8) is located inside the melting drum for optimizing the mixing process.

4. The facility as claimed in claim 2 characterized in that a cross-shaped member (8) is located inside the melting drum for optimizing the mixing process.

* * * * *